US006609948B1

(12) United States Patent
Fontana, Jr. et al.

(10) Patent No.: US 6,609,948 B1
(45) Date of Patent: *Aug. 26, 2003

(54) METHOD OF MAKING AN ELECTRONIC LAPPING GUIDE (ELG) FOR LAPPING A READ SENSOR

(75) Inventors: Robert Edward Fontana, Jr., San Jose, CA (US); Richard Hsiao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 09/724,247

(22) Filed: Nov. 27, 2000

(51) Int. Cl.⁷ .......................... B24B 49/00; B24B 51/00
(52) U.S. Cl. .................. 451/5; 451/1; 451/11; 451/28; 451/259; 29/603.14; 29/603.16
(58) Field of Search ............................. 451/1, 5, 11, 28, 451/259; 29/603.14, 603.16, 603.1

(56) References Cited

U.S. PATENT DOCUMENTS

| 5,023,991 | A | * | 6/1991 | Smith | 29/603.09 |
| 5,588,199 | A | * | 12/1996 | Krounbi et al. | 29/603.1 |
| 5,597,340 | A | * | 1/1997 | Church et al. | 29/603.16 |
| 6,209,193 | B1 | * | 4/2001 | Hsiao | 216/22 |
| 6,415,500 | B1 | * | 7/2002 | Han et al. | 29/603.14 |
| 6,430,011 | B1 | * | 8/2002 | Garfunkel et al. | 360/322 |

* cited by examiner

Primary Examiner—Joseph J. Hail, III
Assistant Examiner—Alvin J Grant

(57) ABSTRACT

An electronic lapping guide (ELG) and method of making are provided for precisely lapping a read sensor to a designed air bearing surface (ABS). In the method a sensor material layer is formed on a wafer after which a portion of the sensor material layer is removed and ELG material is deposited therein. This is followed by forming track widths and back edges for each of the ELG and the read sensor to be followed by lapping to the ABS. Various films are employed for the ELG to minimize magnetoresistance and optimize the resistance of the ELG. The resistance of the ELG is then sensed by a computer for controlling a lapping tool to lap to the aforementioned ABS.

42 Claims, 14 Drawing Sheets (ABS)

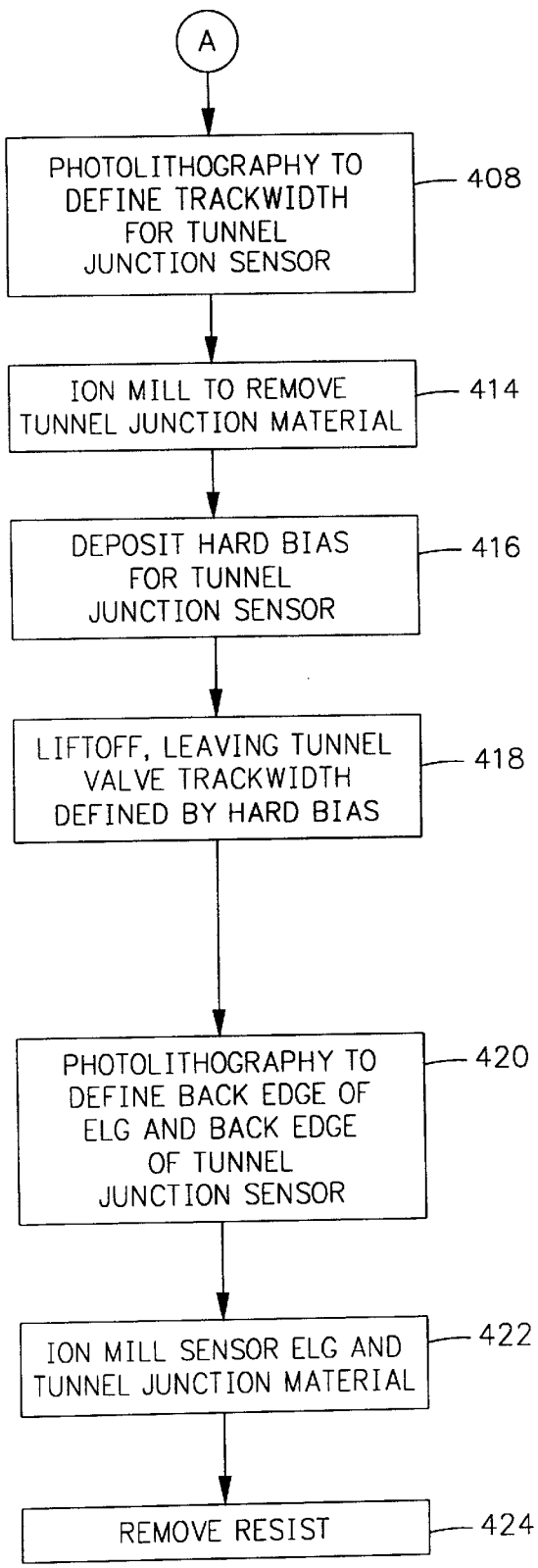
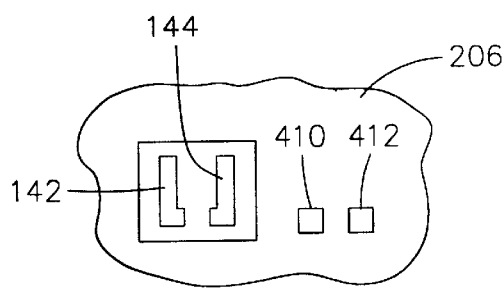
FIG. 14D
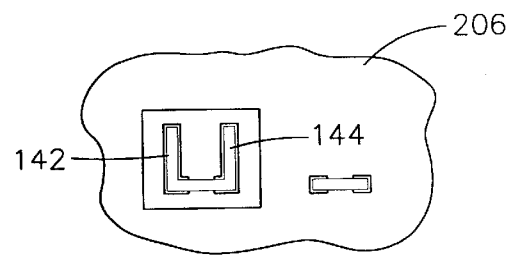
FIG. 14E
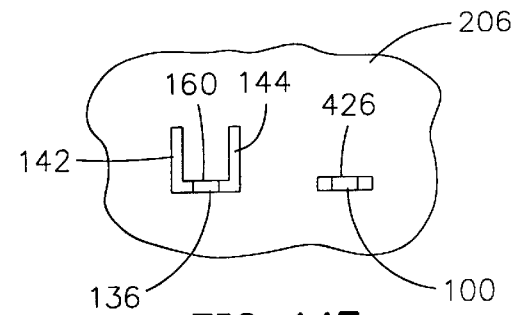
FIG. 14F
FIG. 15
(CONT.)

METHOD OF MAKING AN ELECTRONIC LAPPING GUIDE (ELG) FOR LAPPING A READ SENSOR

BACKGROUND OF THE INVENTION

1. Field of the Invention

The present invention relates to a method of making an electronic lapping guide (ELG) for lapping a read sensor and, more particularly, to an ELG which is composed of a different material than the read sensor so that the ELG is not constrained by the resistance of the sensor nor its magnetoresistance (MR).

2. Description of the Related Art

A typical magnetoresistive (MR) read head includes an MR read sensor which is located between first and second nonmagnetic insulative read gap layers and the first and second read gap layers are located between ferromagnetic first and second shield layers. First and second lead layers are connected to the read sensor for conducting a sense current therethrough. When the read sensor is subjected to positive and negative signal fields from tracks on a rotating magnetic disk in a disk drive the resistance of the read sensor changes. These resistance changes cause potential changes in the sense current circuit, which are processed as playback signals by processing circuitry. The read head has an exterior head surface which faces the rotating magnetic disk and is supported on swirling air from the rotating disk which is referred to as an air bearing. For this reason the head surface is referred to as an air bearing surface (ABS). The read sensor has a back edge which is recessed in the read head opposite the air bearing surface. The back edge is precisely located by photolithography processing. During construction the ABS must also be precisely defined so that the read sensor has a precise stripe height which is the distance between the ABS and the back edge. This is accomplished by lapping (grinding) a wafer on which the MR head is constructed until the ABS is achieved.

The stripe height of MR sensor is determined by lapping the head structure while measuring the resistance of an electrical element. This electrical element is called an electronic lapping guide (ELG). The ELG and the sensor are formed from the same material and the back edge of this ELG is formed in the same photo and subtractive processes as the back edge of the sensor element, i.e. the ELG back edge and the sensor back edge are self-referenced to each other. To the first order the resistance of the ELG, R is inversely proportional to the height of the sensor, i.e.

$$R_{ELG} = \rho \times 1/t \times 1/h \qquad (1)$$

where h is the height of the ELG, l is the length of the ELG, t is the thickness of the ELG, and ρ is the resistivity of the ELG layers. The quantity ρ/t is called the sheet resistance $R_s$. So, the ELG resistance is then $$R_{ELG} = Rs \times 1/h \qquad (2)$$

One problem with the present ELG strategy occurs when smaller sensor heights are required. For present day spin valve heads, Rs~15 ohms/square, l=10 μm, and the target stripe height is 0.5 μm. For proper lapping to the target stripe height, a final ELG resistance of 300 ohms is required. Future spin valve heads may have Rs~20 ohms/sq but with target stripe heights as low as 0.1 μm to 0.2 μm which results in final ELG resistances up to a factor of 5 greater than present spin valve heads. This increase in final resistance will invariably require modification of lapping algorithms and electronics to sense the higher resistance. Although the geometry of the lapping guide can be changed to reduce the final resistance, i.e. decrease the ELG length or offset the back edge of the ELG relative to the sensor element, the lapping precision is degraded since the rate of resistance change versus ELG height is also reduced by these changes.

A second problem with the present ELG strategy occurs when new sensor materials with higher magnetoresistance, DR/R characteristics are used. Future spin valves will have DR/R in the 15% range. When the ELG is formed using this sensor material, the Rs of the ELG can vary by 15% depending on the orientation of the magnetization of the free and pinned layers. These orientations can be perturbed by external fields or by stress induced by the lapping process. Such a Rs change can effect final stripe height by 15% independent of the lapping algorithm precision.

A third problem with the present ELG strategy occurs when "current perpendicular to the plane" (CPP) structures are used, such as tunnel valve sensors. The sheet resistance of such structures as measured across the planes is typically low, <0.1 ohm/sq, making the resistance of the ELG too low for accurate measurements of resistance changes during lapping. This reduces final ELG resistances by a factor of 100 or to values on the order of 2 to 4 ohms. This is particularly so for tunnel valve structures where the sensor consists of capping layers composed of noble metals (Pt, Pd, Rh, Au, Cu).

SUMMARY OF THE INVENTION

The aforementioned problems are overcome by constructing the ELG from a different material than the read sensor with predetermined electrical resistivity and magnetoresistance. After the sensor material is deposited, a photolithography and liftoff process is used to locally remove sensor material and deposit ELG material. The ELG material layer has the same milling endpoint time as the sensor material layer. When this condition is satisfied the process step, which forms the back edge of the ELG and the sensor (i.e. photolithography and ion milling to the endpoint), will create self-aligned and self-referenced back edges for both the sensor and the ELG.

For tunnel junction sensors the leads are designed so that the current flows perpendicular to the planes of the major thin film surfaces of the sensor (CPP) while in a spin valve sensor the leads are designed so that the current flows parallel to the planes of the major thin film surfaces of the sensor (CIP). In both instances the leads of the ELG are designed so that a current flows parallel to the major thin film surfaces of the ELG. In the present invention two separate lead structures are formed by separate photolithography steps but the back edge of both the ELG and the spin valve sensor are still formed in a single process step.

An object of the present invention is to provide an ELG and a method of making wherein the ELG is constructed from a different material than a read sensor so that the ELG is not constrained by the resistance of the sensor nor its magnetoresistance.

Another object is to provide and make an ELG for lapping read sensors wherein the ELG does not have to be changed when the material of the read sensor is changed.

Other objects and attendant advantages of the invention will be appreciated upon reading the following description taken together with the accompanying drawings.

BRIEF DESCRIPTION OF THE DRAWINGS

FIGS. 14A–14F illustrate plan views of the formation of a tunnel valve sensor and an ELG by various photolithography steps;

DESCRIPTION OF THE PREFERRED EMBODIMENTS

Figure 1:
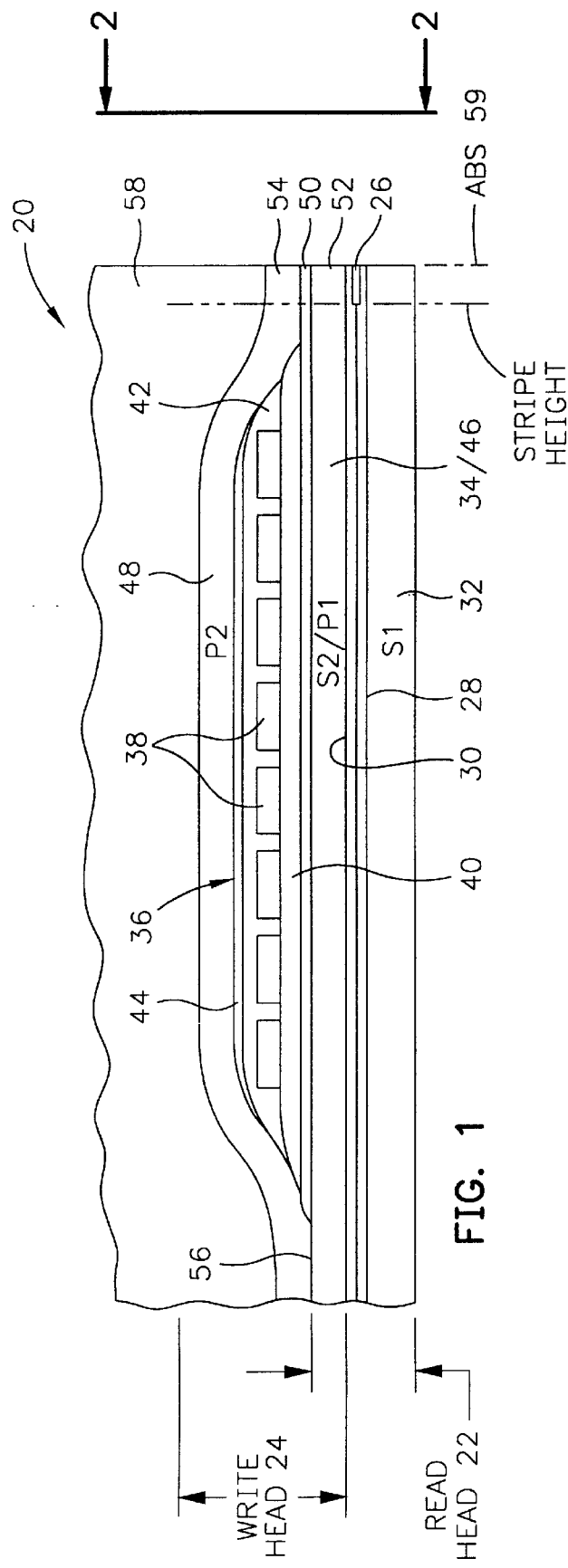
FIG. 1 is a cross-sectional side view of a magnetic head assembly which includes a read head and a write head.
Figure 2:
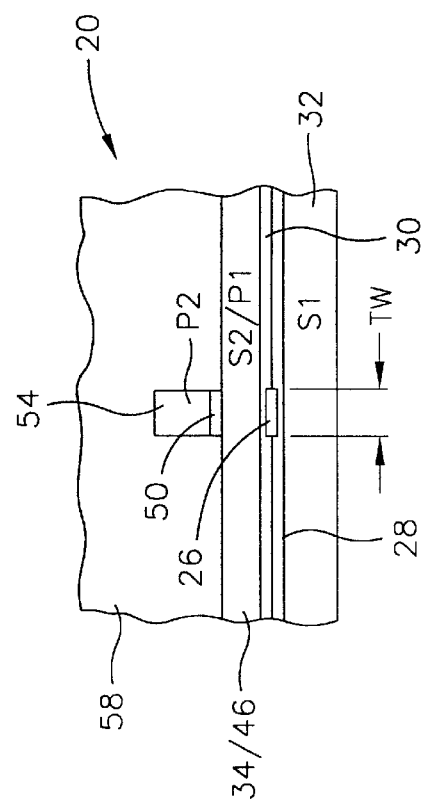
FIG. 2 is a view taken along plane 2—2 of FIG. 1.

A typical head assembly 20 is illustrated in FIG. 1 which includes a read head portion 22 and a write head portion 24. The read head portion includes a magnetoresistive (MR) read sensor 26 which is located between nonmagnetic insulative first and second read gap layers 28 and 30. The first and second read gap layers 28 and 30 are, in turn, located between ferromagnetic first and second shield layers (S1) and (S2) 32 and 34. The write head includes an insulation stack 36 which has a write coil 38 which is located between first and second nonmagnetic insulative layers 40 and 42. The insulation may further have a third nonmagnetic insulation layer 44 on top of the insulation layer 42 for smoothing out ripples of the second insulation layer. The insulation stack 36 is located between ferromagnetic first and second pole piece layers (P1) and (P2) 46 and 48. A write gap layer 50 is located between first and second pole tip portions 52 and 54 of the first and second pole piece layers and the first and second pole piece layers are connected at a back gap 56. An overcoat layer 58 is on top of the magnetic head assembly. This type of magnetic head assembly is known in the art as a merged MR head since the second shield layer 34 and the first pole piece layer 46 are a common layer. Another type of magnetic head assembly employs separate layers for the first shield layer and the first pole piece layer with an isolation insulative layer therebetween. This latter head is known in the art as a piggyback head. In either type of head assembly the head assembly, as well as the wafer upon which it is constructed, must be lapped to an air bearing surface (ABS) 59, as shown in FIG. 1. This establishes a stripe height for the read sensor 26, which is also shown in FIG. 1. The lapping of a row of head assemblies from the wafer must be precise in order to establish a proper stripe height for each read sensor. When the stripe height is not precisely defined the resistance of the read sensor to a sense conducted therethrough is different from the designed resistance which will impact the accuracy of playback signals. FIG. 2 is an ABS illustration of FIG. 1 taken along plane 2—2 showing the track width (TW) of the read sensor 26.

Figure 3:
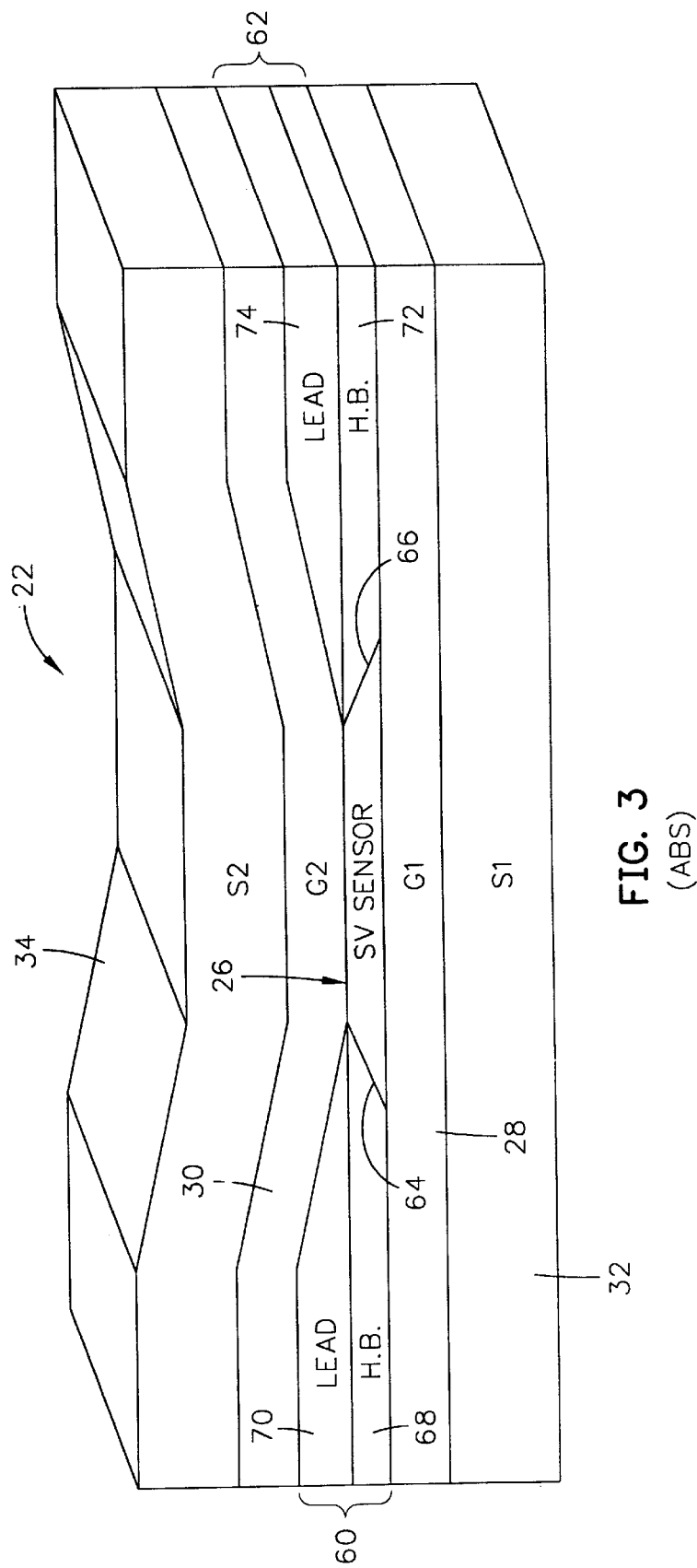
FIG. 3 is an enlarged isometric illustration of the read head.

FIG. 3 shows an enlarged isometric illustration of the read head 22 when it employs a spin valve (SV) sensor 26, which will be discussed in more detail hereinafter. The read head is shown with first and second hard bias (HB) and lead layers 60 and 62 connected to first and second side edges 64 and 66 of the sensor. The first hard bias and lead layer 60 includes a hard bias film 68 and a first lead film 70, and the second hard bias and lead layer 62 includes a second hard bias film 72 and a second lead layer film 74. The first and second hard bias and lead layers 60 and 62 conduct a sense current through the spin valve sensor 26, as discussed hereinabove. In another type of read head a tunnel junction (TJ) sensor is employed which does not employ the first and second hard bias and lead layers 60 and 62 shown in FIG. 3. In contrast, the sense current is conducted perpendicular to the films of the TJ sensor in contrast to parallel to the films of the sensor, as shown in FIG. 3. When the TJ sensor is employed the first and second shield layers 32 and 34 may be employed as leads with conductive vias (not shown) extending between the TJ sensor and the first and second shield layers. When spin valve sensors are constructed with a very high resistance the sense current may also be conducted perpendicular to the films of the spin valve sensor in the same manner as the TJ sensor. When the sense current is conducted parallel to the films of the sensor, this is referred to as a current in-plane (CIP) sensor, whereas when the sense current is conducted perpendicular to the films of the sensor, this is referred to as a current perpendicular to the planes (CPP) type of sensor.

Figure 4:
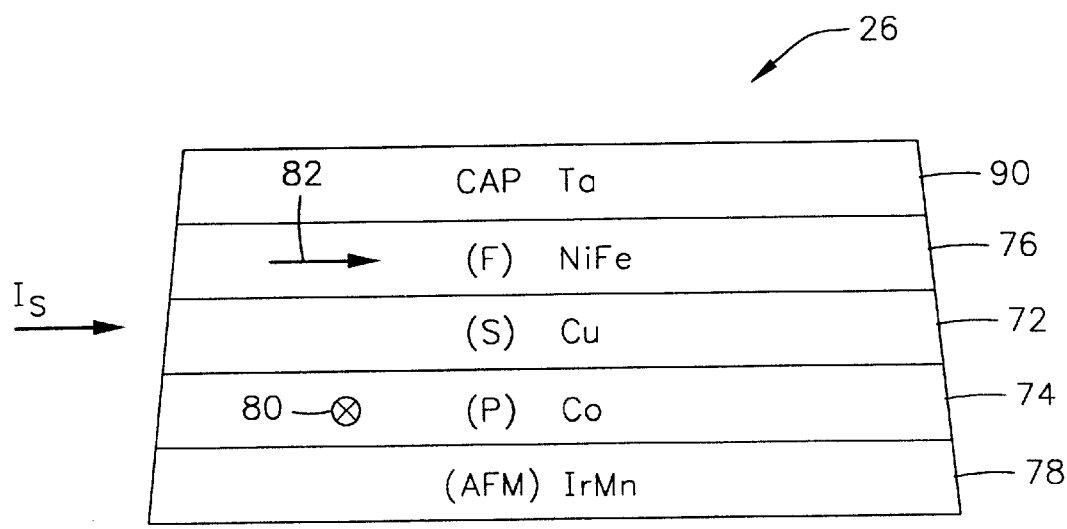
FIG. 4 is an ABS illustration of a typical spin valve sensor.

FIG. 4 is an ABS illustration of the spin valve sensor 26 which is exemplary of spin valve sensors existing in the art. The spin valve sensor 26 includes a nonmagnetic conducting spacer layer (S) 72 which is located between a ferromagnetic pinned layer (P) 74 and a ferromagnetic free layer (F) 76. The pinned layer 74 is exchange coupled to an antiferromagnetic (AFM) pinning layer 78 which pins a magnetic moment 80 of the pinned layer perpendicular to the ABS, such as into the read head, as shown in FIG. 4. The free layer 76 has a magnetic moment 82 which is parallel to the ABS and may be directed from left to right, as shown in FIG. 4. A cap layer 90 is located on the free layer 76 for protecting it from subsequent processing steps. Exemplary materials of the layers are iridium manganese (IrMn) for the layer 78, cobalt (Co) for the pinned layer 74, copper (Cu) for the spacer layer 72, nickel iron (NiFe) for the free layer 76 and tantalum (Ta) for the cap layer 90. When signal fields rotate the magnetic moment 82 of the free layer, this changes the resistance of the spin valve sensor to the sense current which, in turn, causes a change in potential which is processed as a playback signal by a processing circuit (not shown).

Figure 5:
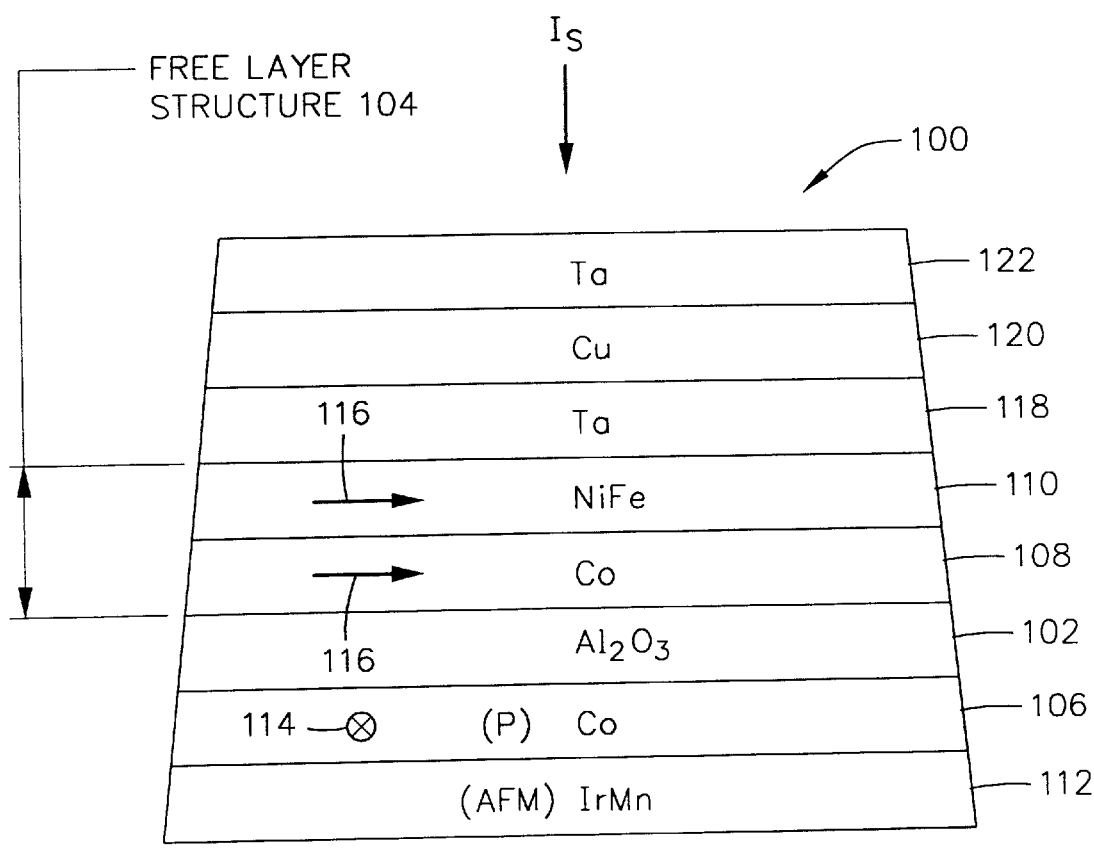
FIG. 5 is an ABS illustration of a typical tunnel valve sensor.

A typical tunnel junction read sensor 100 is illustrated in FIG. 5 which includes a nonmagnetic insulative tunneling or barrier layer 102 which is located between a free layer 104 and a pinned layer (P) 106. The free layer 104 may include first and second films 108 and 110. The pinned layer 106 is exchange coupled to an antiferromagnetic layer (AFM) 112 which pins a magnetic moment 114 of the pinned layer perpendicular to the ABS, such as into the read head, as shown in FIG. 5. The free layer 104 has a magnetic moment 116 which is oriented parallel to the ABS and may be directed from left to right, as shown in FIG. 5. Located on top of the film 110 are capping layers 118, 120 and 122. Exemplary materials for the layers are iridium manganese (IrMn) for the pinning layer 112, aluminum oxide (AlO) for the tunneling layer 102, cobalt (Co) for the film 108, nickel iron (NiFe) for the film 110, tantalum (Ta) for the layer 118, copper (Cu) for the layer 120 and tantalum for the layer 122. When a signal field rotates the magnetic moment 116, resistance changes are processed as playback signals by processing circuitry.

Figure 6:
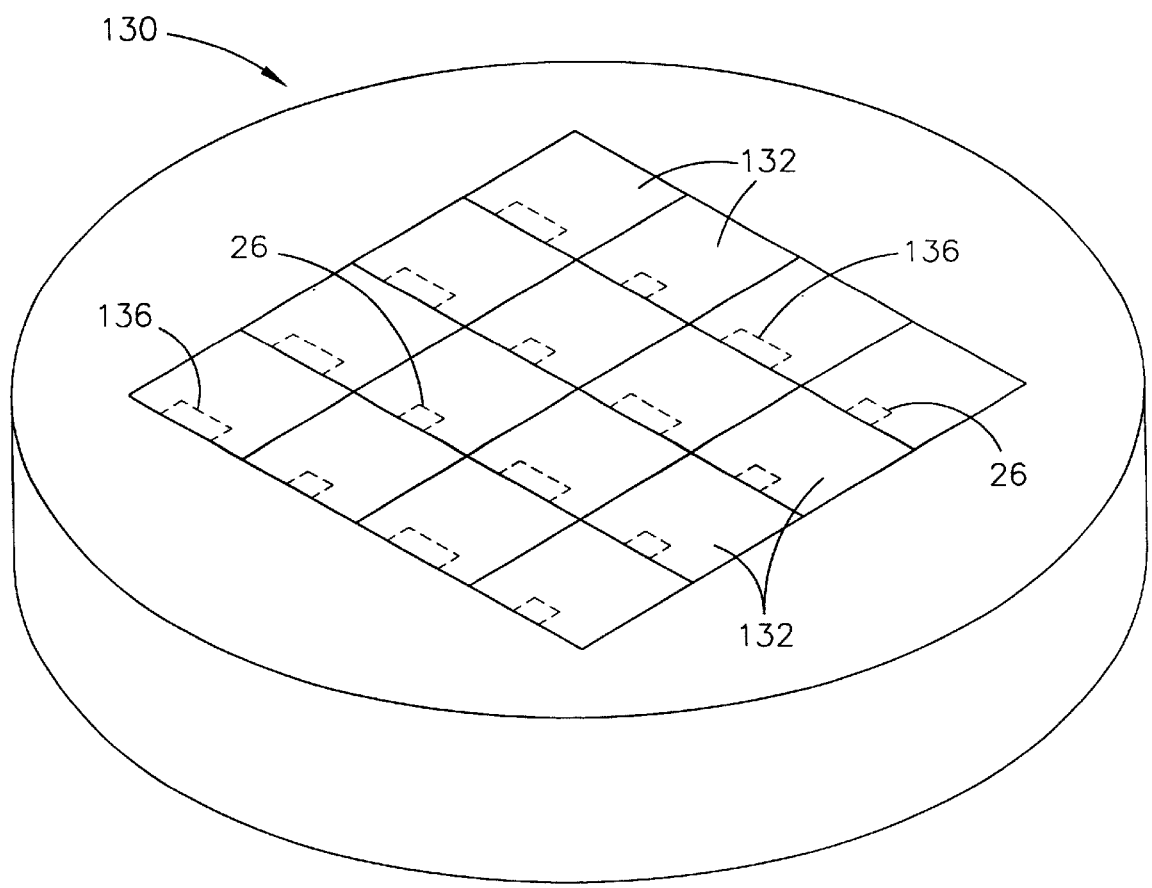
FIG. 6 is an isometric illustration of a wafer having rows and columns of read heads and ELGs.

Rows and columns of magnetic head assemblies are typically constructed on a wafer 130, as shown in FIG. 6, at exemplary sites 132. Each row may contain multiple read sensors 26 and multiple electronic lapping guides (ELG) 136. Other components of the magnetic head assembly, which are in reality present, are omitted so that only the read sensor portion of each magnetic head assembly is shown hidden below the surface. It can be seen that the track width of the ELG 136 is greater than the track width of the read sensor 26. After constructing the read sensors and the ELGs the rows and columns of sensors and ELGs in FIG. 6 are diced into rows, one of which is shown at 140 in FIG. 7. For example, the read sensors are shown as spin valve sensors 26 with the first and second hard bias and lead layers 60 and 62 connected thereto. First and second lead layers 142 and 144 are connected to first and second side edges of each electronic lapping guide 136. After the row 140 has been diced it is necessary that the row be lapped until the air bearing surface (ABS) of each magnetic head assembly has been precisely formed.

Figure 7:
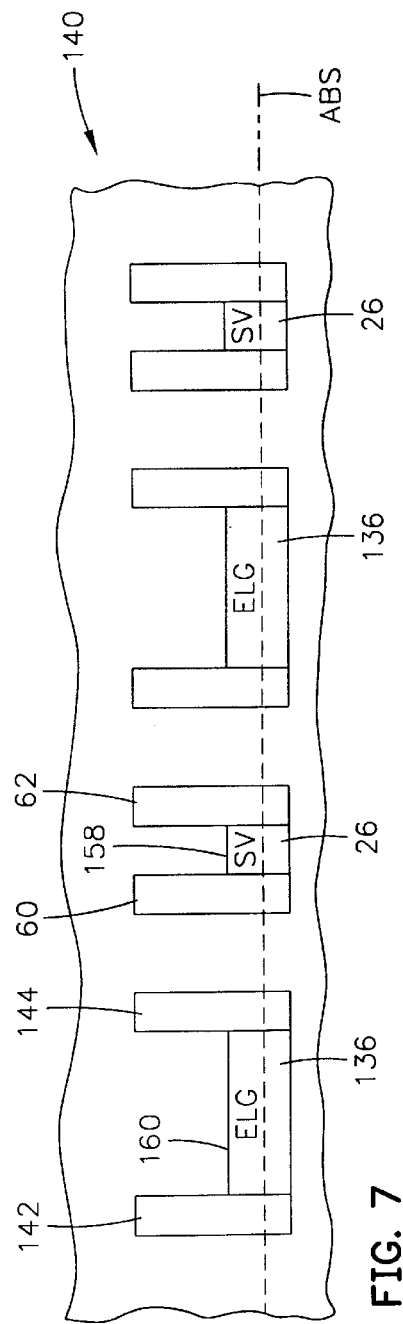
FIG. 7 is an enlarged illustration of a row of read sensors and ELGs from FIG. 6.
Figure 8:
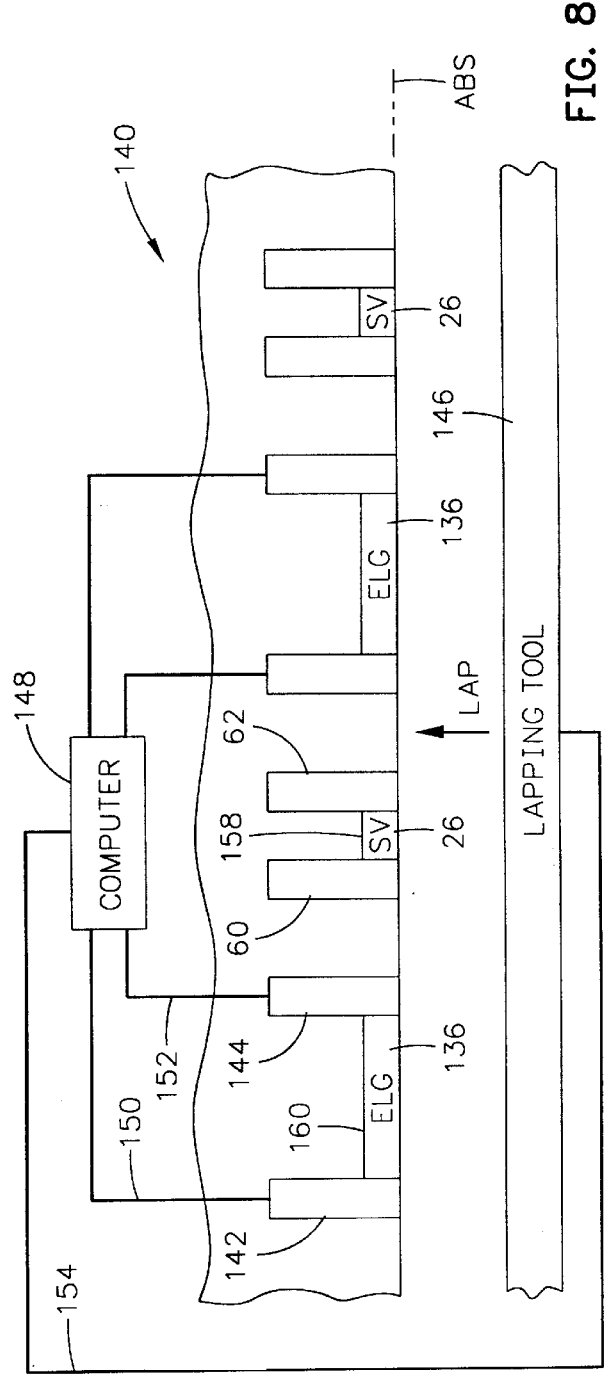
FIG. 8 is the same as FIG. 7 except the row of read sensors and ELGs has been lapped to an ABS by a lapping tool which is controlled by a computer.

In FIG. 8 a lapping tool 146 has lapped the row of spin valve sensors and ELGs to the ABS. This has been accomplished by a lapping algorithm in a computer 148. Leads 150 and 152 connect the leads 142 and 144 of the ELGs 136 to the computer 148 and the computer is connected by a lead 154 to the lapping tool 146. As the lapping tool 146 laps the row of read heads and ELGs the resistances of the ELGs change which is sensed by the computer. When the resistance is at a predetermined level, which corresponds to the location of the ABS, the computer 148 terminates the operation of the lapping tool 146. If the computer 148 senses a higher resistance, for instance, from the left ELG as compared to the right ELG, this indicates that the left side of the row is being lapped more than the right side, which will then cause the computer 148 to operate one or more pistons (not shown) of the lapping tool to apply more pressure to the right side of the lapping tool as compared to the left side until the resistances from the left and right ELGs are equalized. Back edges 158 and 160 of the read sensors 26 and the ELGs 136 have been previously formed on the wafer. Operation of the ELGs 136 is extremely important to establish the ABS at the precise designed location so that the distance between the ABS and the back edges 158 of the read sensors is precisely defined. This distance is known as the stripe height, as discussed hereinabove. It should be understood that the tunnel valve sensor 100 may be used in place of each of the spin valve sensors 26 in FIGS. 7 and 8. In this instance, the first and second lead layers 60 and 62 are omitted, since the tunnel valve sensor receives its sense current perpendicular to the planes of its layers. The formation of an ELG and a tunnel valve sensor in a row on the wafer will be discussed in more detail hereinafter.

Figure 9A:
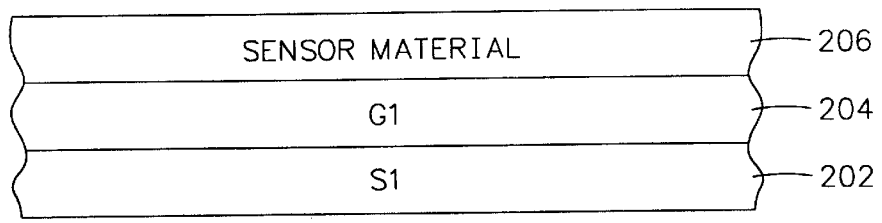
FIGS. 9A–9F illustrate a lead layer being constructed by a photolithography liftoff process.
Figure 9B:
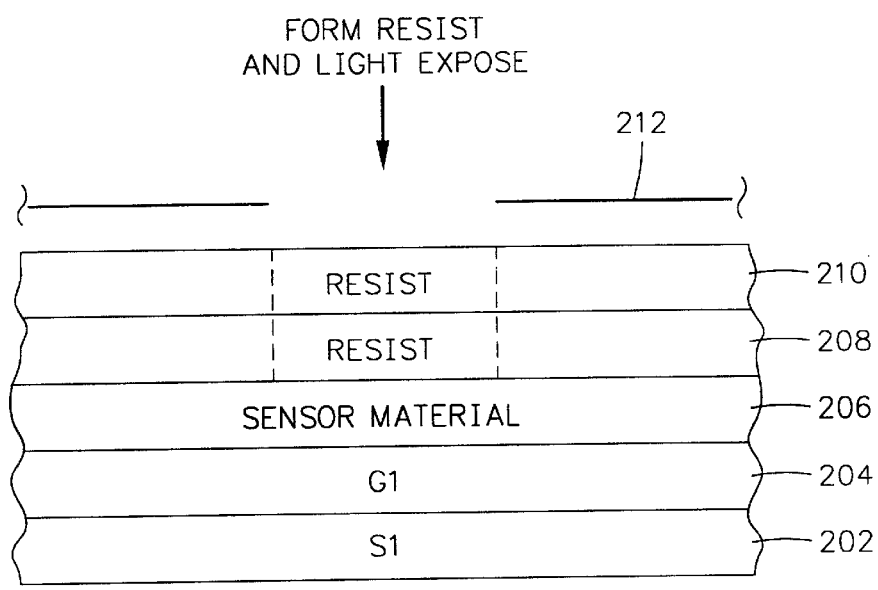
Figure 9C:
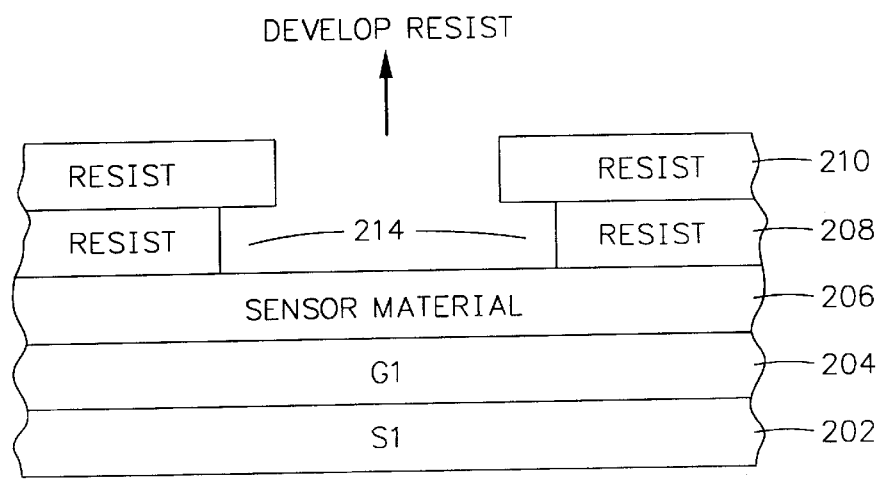
Figure 9D:
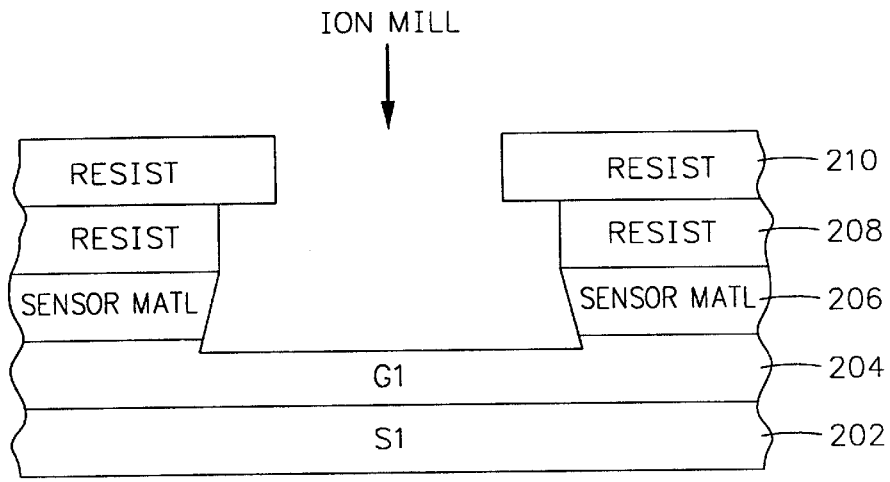
Figure 9E:
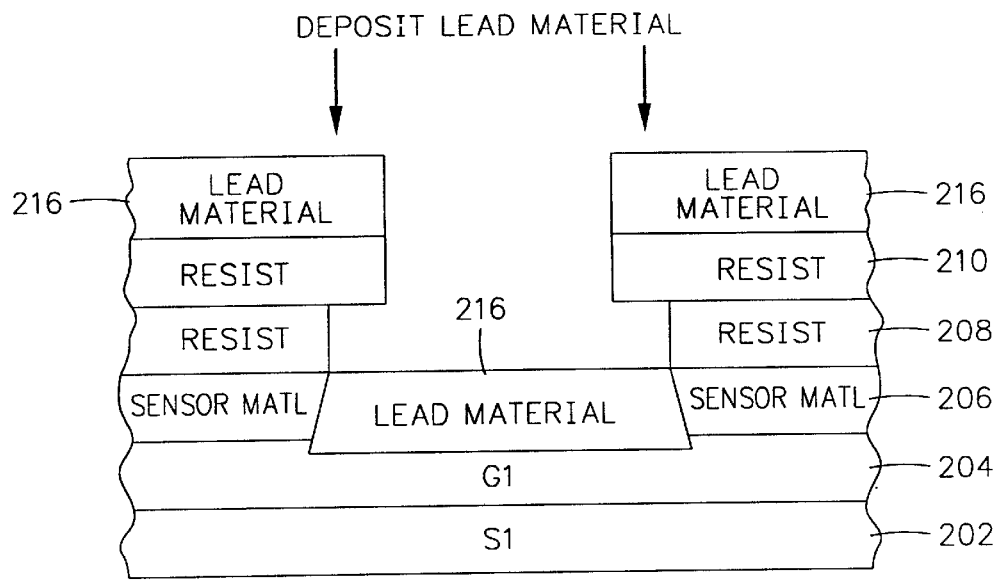
Figure 9F:
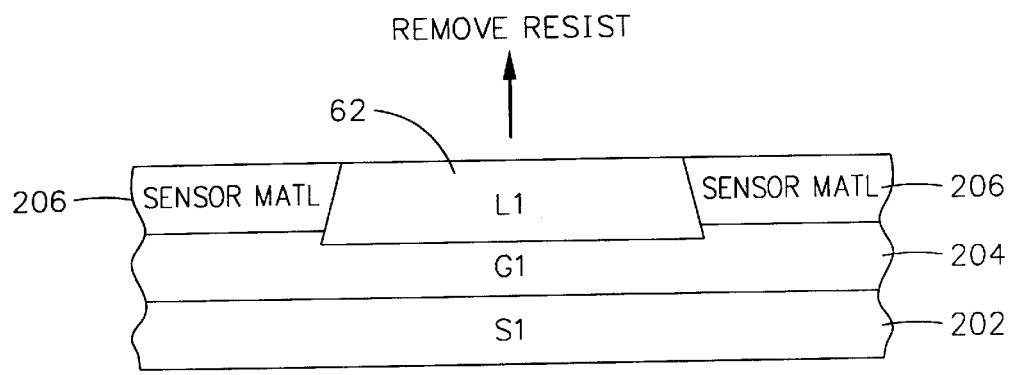

FIGS. 9A–9F illustrate an exemplary process for constructing one of the lead layers (L1) 62, as shown in FIG. 9F. In FIG. 9A a first shield layer (S1) 202 is constructed on a wafer (not shown), a first read gap layer (G1) 204 is constructed on the first shield layer and a sensor material layer 206 is constructed on the first read gap layer 204. The sensor material layer may be a series of layers for the spin valve sensor 26 shown in FIG. 4 or a series of layers for the tunnel valve sensor 100 shown in FIG. 5. In FIG. 9B a bilayer resist 208 and 210 is spun on the wafer and light-exposed through a mask 212. Assuming that the resist layers 208 and 210 are a positive resist, the resist layers are developed in FIG. 9C which removes the light-exposed portions and the layers are then subjected to an etchant which etches away a portion of the bottom layer 208 without etching away the top layer 210. This causes the bilayer resist to have an undercut 214. A portion of the sensor material layer 206, which is exposed by an opening in the resist layers, is then ion milled in FIG. 9D with a slight overmilling into the first read gap layer 204 to ensure its complete removal. In FIG. 9E a lead layer material 216 is deposited over the entire wafer into the opening and on top of the resist layers. In FIG. 9F the resist layers are removed by a solution which leaves the lead layer (L1) 62. This process is known as a bilayer photoresist liftoff process.

Figure 10A:
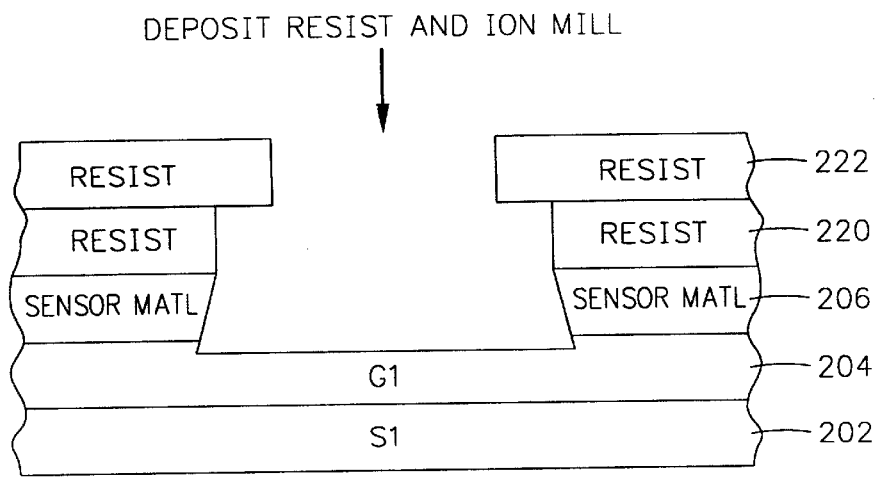
FIGS. 10A–10C illustrate in cross-section an ELG being constructed by a photolithography liftoff process.
Figure 10B:
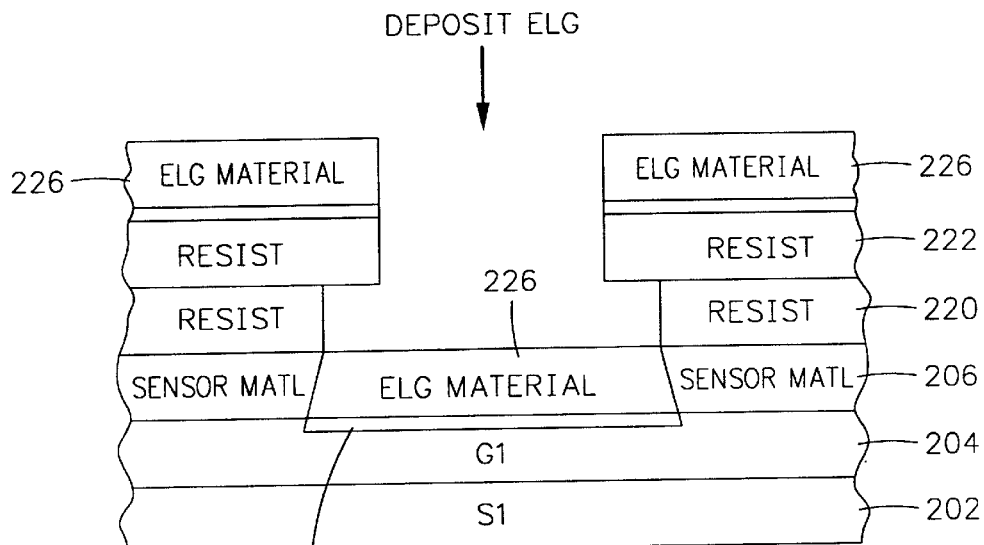
Figure 10C:
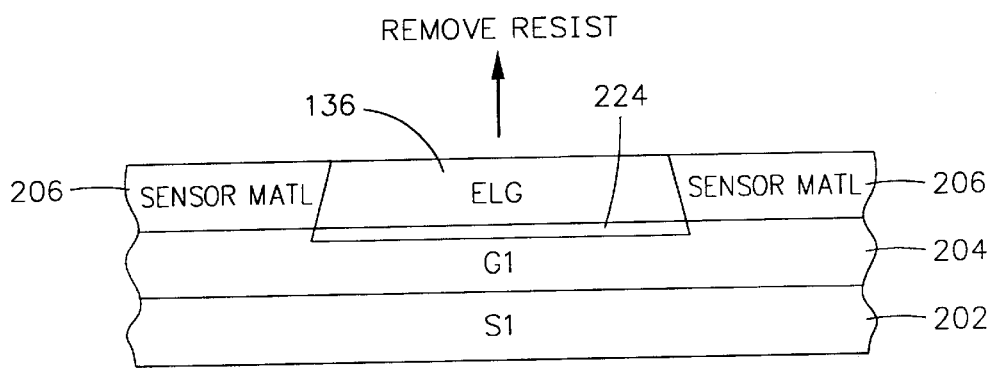

FIGS. 10A–10C show a bilayer photoresist process for forming the ELG 136 shown in FIG. 10C. After forming the first shield layer 202, the first read gap layer 204 and the sensor material layer 206, as shown in FIG. 9A, a bilayer photoresist 220 and 222, as shown in FIG. 10A, is formed in the same manner as the bilayer photoresist 208 and 210 in FIGS. 9B and 9C. In FIG. 10A the sensor material layer has been ion milled with a slight overmilling into the first read gap layer 204. In FIG. 10B an insulation layer 224 and ELG layer 226 is deposited over the entire wafer. In FIG. 10C the bilayer photoresist has been removed which leaves the insulation layer 224 and the ELG 136. The insulation layer 224 is important for insulating the ELG from the conductive first shield layer 202. It should be understood that the first read gap layer 204 may become very thin after overmilling which may expose pin holes between the first shield layer and the ELG which will cause shorting between these layers. The insulation layer 224 will cover these pin holes so as to obviate this problem.

Figure 11A:
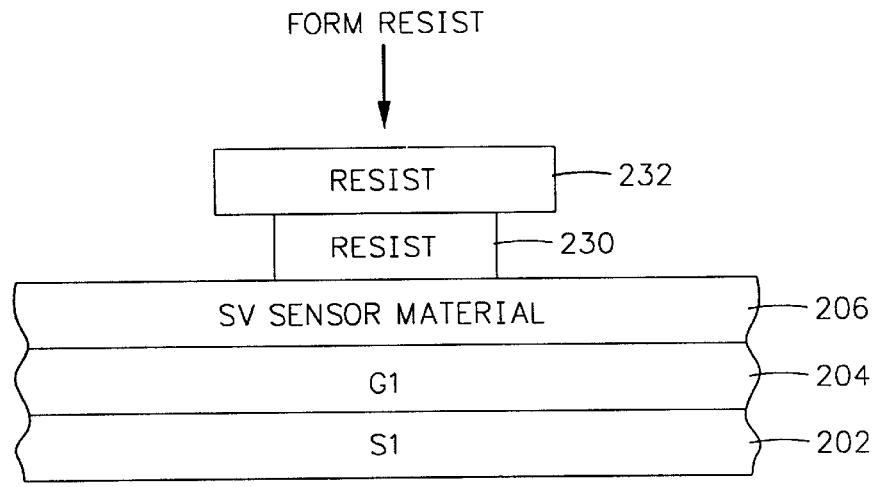
FIGS. 11A–11C illustrate the formation of a back edge of a spin valve or tunnel valve sensor by photolithography processing.
Figure 11B:
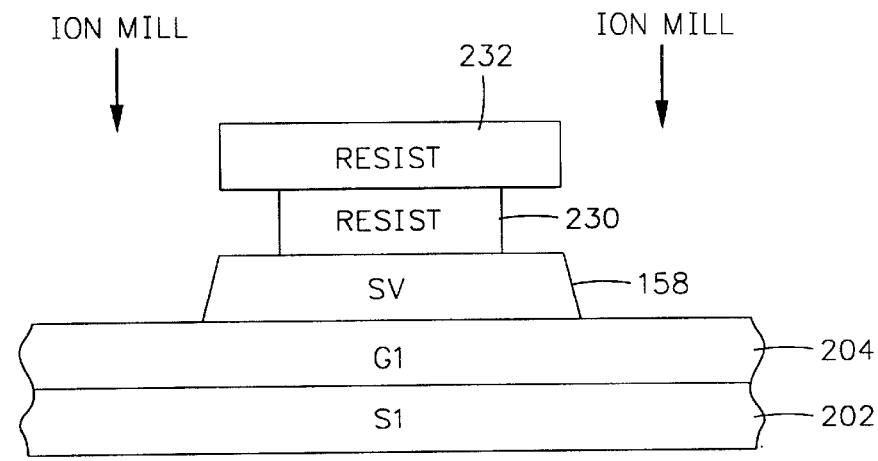
Figure 11C:
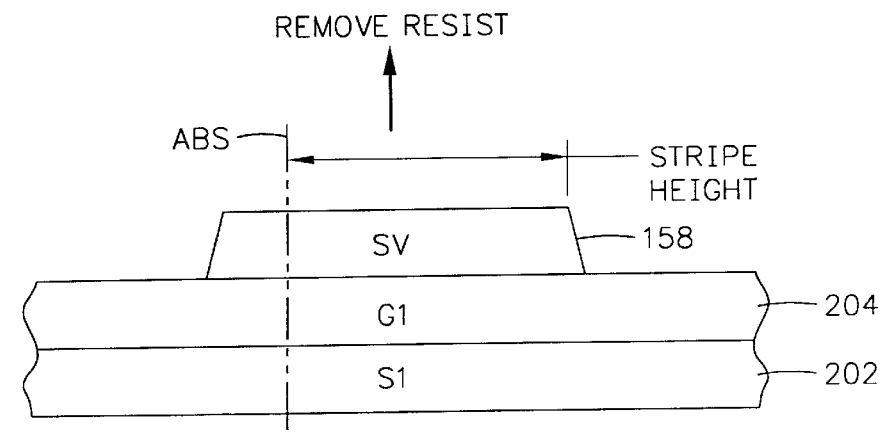

FIGS. 11A–11C show a bilayer photoresist process for forming the back edge 158 of the spin valve sensor 26. The bilayer photoresist 230 and 232 is formed on the sensor material layer 206 in a similar manner to the steps shown in FIGS. 9B and 9C. In FIG. 11B ion milling is implemented to remove all of the spin valve sensor material except for the spin valve sensor material below the bilayer photoresist 230 and 232. This then forms the back edge 158. In FIG. 11C the bilayer photoresist has been removed so that the remainder of the read head may be constructed. In FIG. 11C the ABS site is shown and must be formed as previously described in reference to FIGS. 7 and 8. Again, when the ABS 59 (see FIG. 1) is formed the distance between the ABS 59 and the back edge 158 is the stripe height of the spin valve sensor. It should be understood that in place of the spin valve sensor may be the tunnel valve sensor as previously described.

Figure 12A:
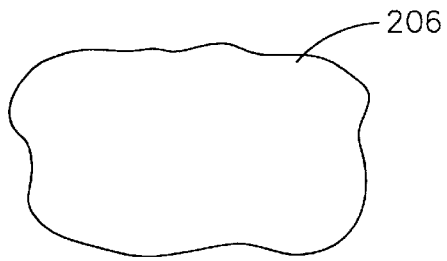
FIGS. 12A–12E show plan views of the formation of a spin valve sensor and an ELG by photolithography techniques.
Figure 12B:
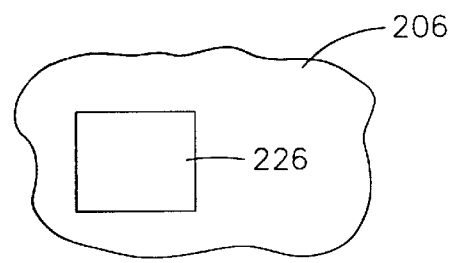
Figure 12C:
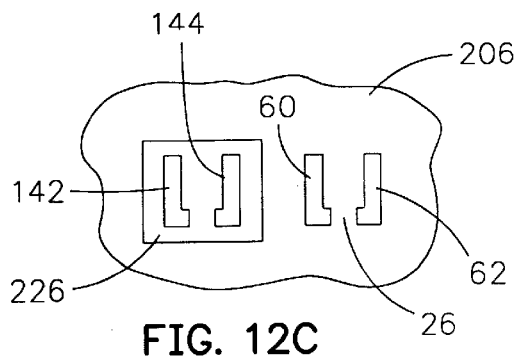
Figure 13:
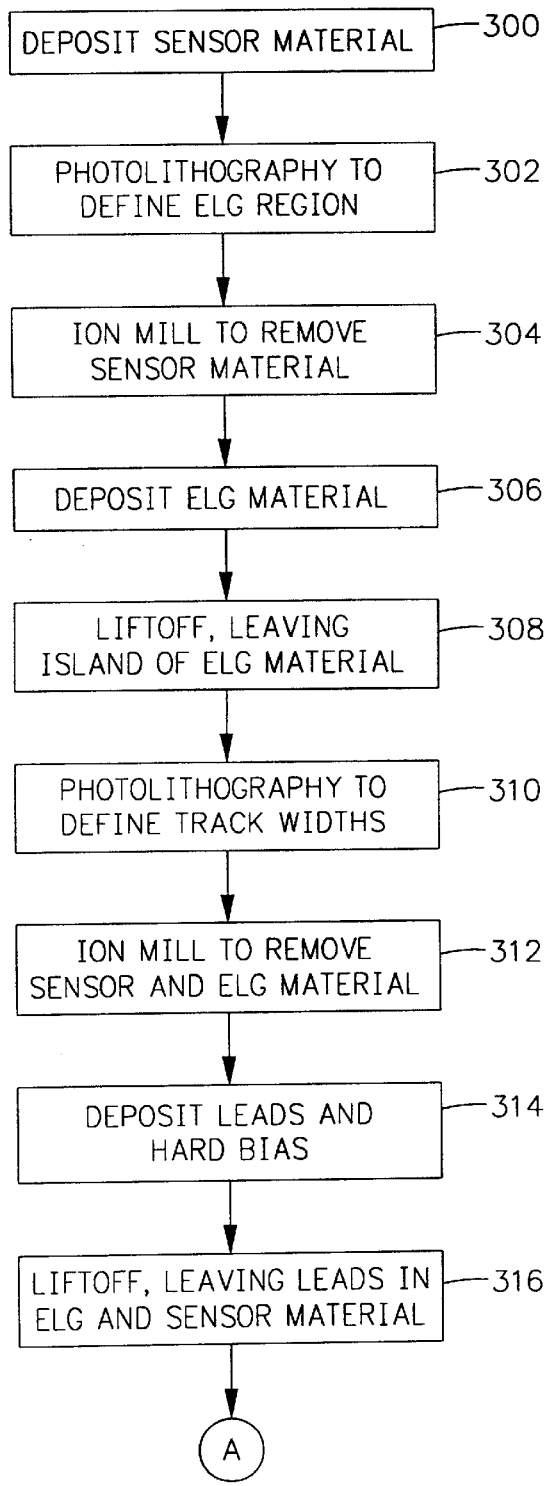
FIG. 13 is a block diagram illustrating various photolithography steps which correspond to FIGS. 12A–12E.
Figure 13:
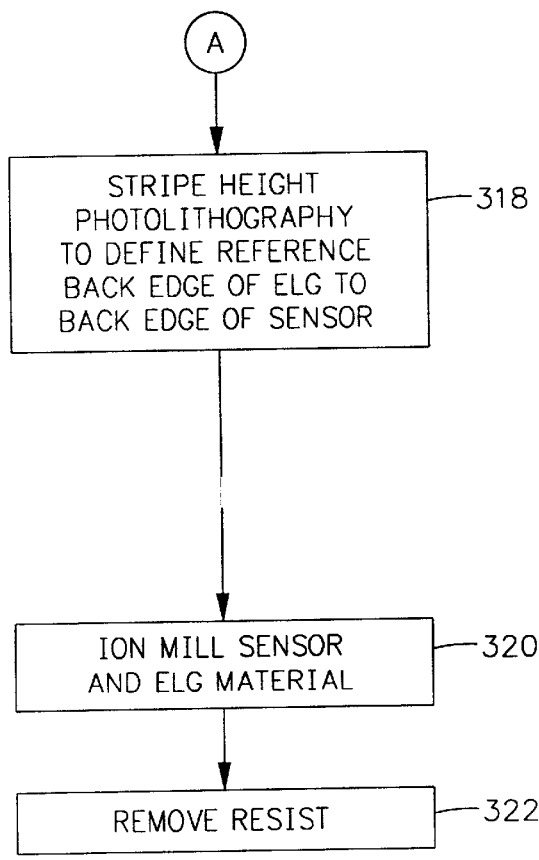
Figure 12D:
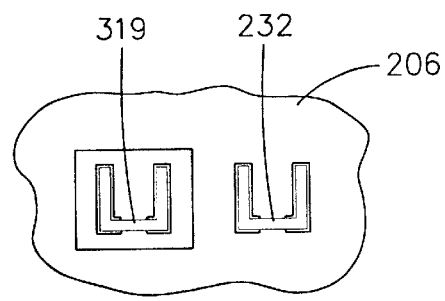
Figure 12E:
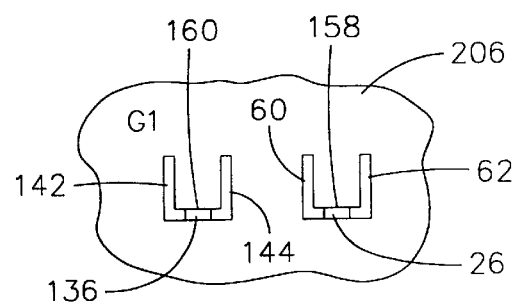

FIGS. 12A–12E in conjunction with FIG. 13 show a process for fabricating a spin valve sensor 26 and an ELG 136, as shown in FIG. 12E. In block 300 a spin valve sensor material layer is deposited on the wafer, as shown at 206 in FIGS. 12A and 9A. In block 302 photolithography defines the ELG region, as shown in FIGS. 9B and 9C. In block 304 ion milling removes the sensor material, as shown in FIG.

10A. In block 306 ELG material is deposited on the wafer, as shown in FIG. 10B. Optionally, an insulation layer 224, as shown in FIG. 10B, may be deposited before the ELG material. In block 308 the bilayer photoresist is lifted off, as shown in FIG. 10C, leaving the ELG material layer 226, as shown in FIG. 12B. In block 310 photolithography defines the track widths of the spin valve sensor and the ELG, which is similar to the step shown in FIG. 11A for each of the sensor and the ELG. In block 312 ion milling is implemented to remove sensor and ELG material, which is similar to that shown in FIG. 11B. In block 314 leads and hard bias material layers are deposited and connected to first and second side edges of the spin valve sensor. In block 316 the bilayer photoresist is removed leaving leads connected to the ELG and the sensor, similar to FIG. 9F, and as shown in FIG. 12C. In block 318 photolithography 319 and 232 (see FIG. 11B) defines the back edges of the ELG and the sensor for establishing stripe heights, as shown in FIG. 12D. In block 320 ion milling is implemented to remove sensor and ELG material, similar to FIG. 11B for the sensor, and as shown in FIG. 11B. In block 322 the bilayer photoresist is removed to leave the sensor 26 and the ELG 136 with defined back edges 158 and 160, respectively, as shown in FIGS. 7 and 12E.

Figure 14A:
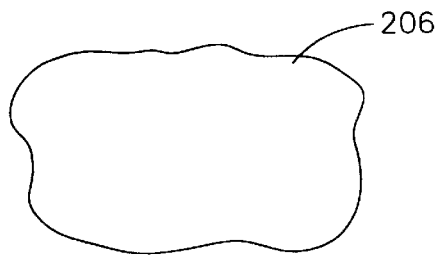
Figure 15:
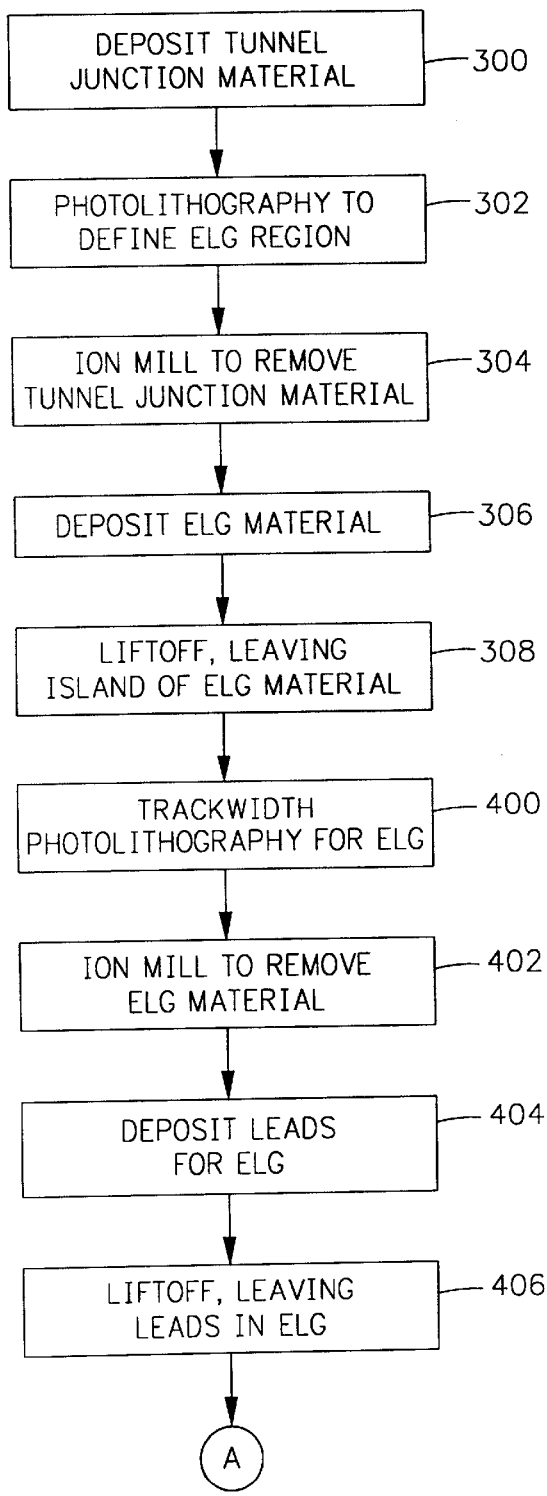
FIG. 15 is a block diagram of various photolithography steps which correspond to FIGS. 14A–14F.
Figure 14B:
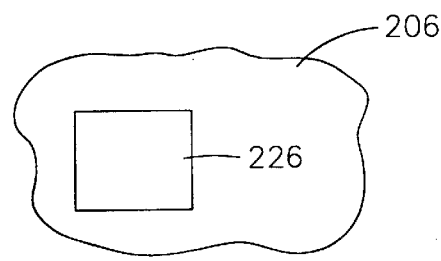
Figure 14C:
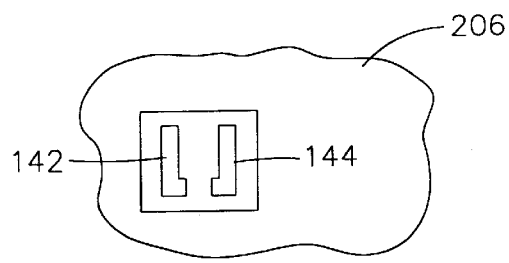

FIGS. 14A–14F in conjunction with FIG. 15 show a series of steps for fabricating an ELG and a tunnel junction sensor. FIGS. 14A and 14B are the same as FIGS. 12A and 12B and the steps 300, 302, 304, 306 and 308 are the same as the steps previously described in FIG. 13. In block 400 photolithography defines the track width of the ELG, which is the same as defining the track width of the ELG in FIG. 12C. The difference between FIGS. 14C and 12C is that the track width of the tunnel junction sensor is not defined in this photolithography step. In block 402 ion milling removes the ELG material, similar to block 312, and in block 404 lead material is deposited for connection to the ELG, similar to block 314. In block 406 the bilayer photoresist is removed leaving the leads connected to the ELG, similar to block 316. In block 408 photolithography defines the track width of the tunnel junction sensor at sites for hard bias layers 410 and 412, as shown in FIG. 14D. This is similar to the steps shown in FIGS. 9B and 9C for each of the sites 410 and 412. In block 414 ion milling removes the tunnel junction material, which is similar to FIG. 9D. In block 416 hard bias material is deposited for the tunnel junction sensor over the entire wafer, which is similar to that shown in FIG. 9E. As shown in block 418 the bilayer photoresist is lifted off the wafer leaving the tunnel junction sensor track width defined by the hard bias layers 410 and 412, as shown in FIG. 14C and as similarly shown in FIG. 9F. In block 420 photolithography defines the back edges of the ELG and the tunnel junction sensor with the back edge of the ELG being defined, as shown on the left side of FIG. 14E, which is the same as the left side of FIG. 12D. On the right side of FIG. 14E the tunnel junction sensor and the hard bias layers 410 and 412 are covered with photoresist so that its back edge can be defined similar to that as shown in FIG. 11A. In block 422 ion milling removes all of the sensor and tunnel junction sensor material not covered by the photoresist, as shown similarly in FIG. 11B. In block 424 the bilayer photoresist is removed, similarly to FIG. 11C, leaving the tunnel junction sensor 100 with a back edge 426 and the ELG 136 with a back edge 160. The wafer is now ready to be lapped to define the ABS, as shown in FIGS. 7 and 8.

Figure 16:
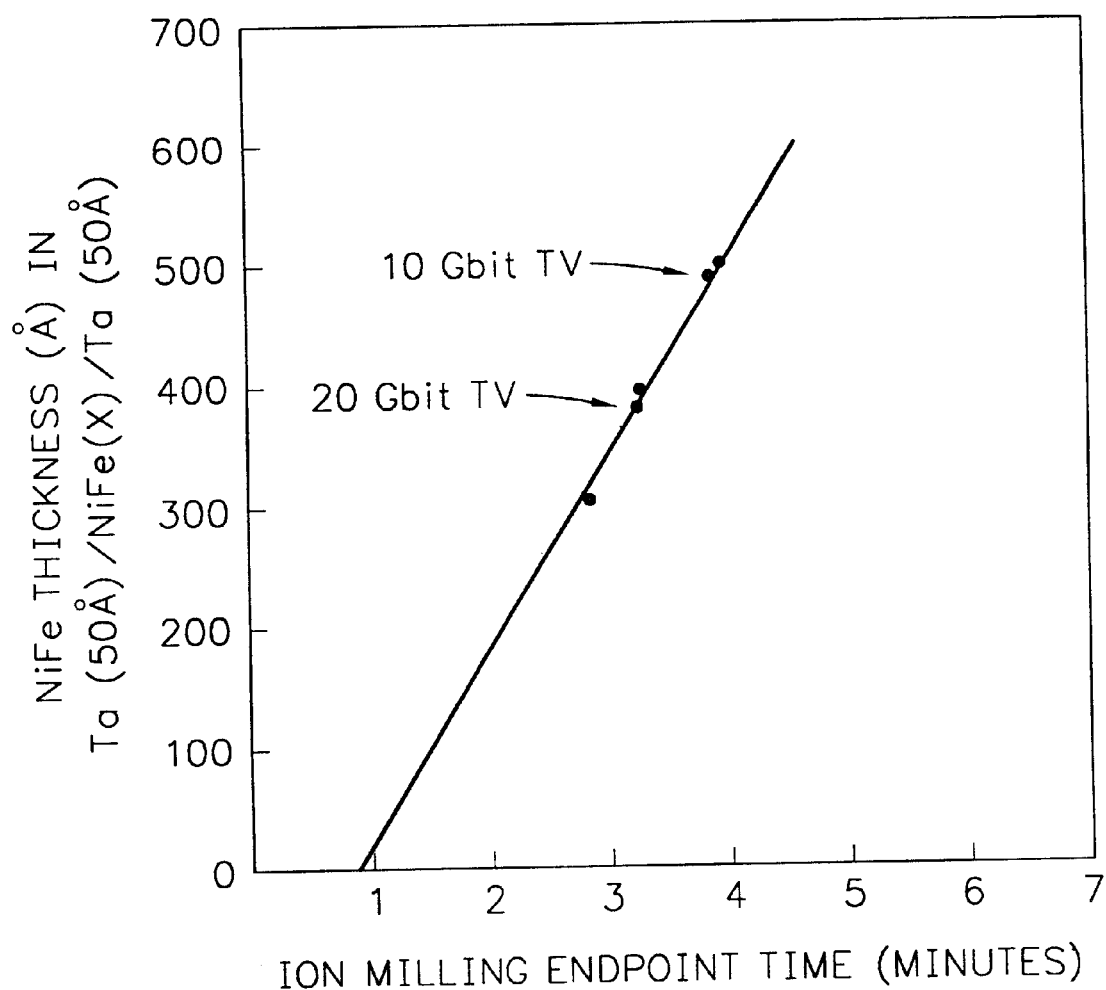
FIG. 16 is a graph illustrating thicknesses of layers in an ELG versus ion milling endpoint times for various tunnel valve sensors.

FIG. 16 is a chart of various thicknesses of the ELG layer versus various ion milling end point times for tunnel junction sensors with various storage capacities. The ELG along the ordinate is a nickel iron (NiFe) film located between first and second tantalum (Ta) films. Each of the tantalum films are 50 Å in thickness and the nickel iron (NiFe) is a variable thickness x. An exemplary 10 gigabit tunnel junction sensor includes a 200 Å thick iridium manganese (IrMn) pinning layer, a 17 Å thick cobalt (Co) pinned layer, a 5 Å thick aluminum oxide (AlO) barrier layer, a 10 Å thick cobalt (Co) first free layer, a 40 Å thick nickel iron (NiFe) second free layer followed by a 50 Å thick tantalum (Ta) layer, a 430 Å thick copper (Cu) layer and a 50 Å thick tantalum (Ta) layer. In order for the ELG to be milled at the same rate and therefore have the same milling end point as the tunnel junction sensor just described, as shown in block 422, for defining the back edges of the ELG and the tunnel junction sensor, the thickness of the nickel iron (NiFe) film in the ELG should be 450 Å and the milling time is about 4 minutes, as shown by the chart in FIG. 16. A 20 gigabit tunnel junction sensor is the same as the 10 gigabit tunnel junction sensor except the copper (Cu) is 230 Å instead of 430 Å. For a 20 gigabit tunnel junction sensor, it can be seen from the chart that the nickel iron (NiFe) film in the ELG should be 350 Å instead of 450 Å in order to achieve the same ion milling end point which is a little more than three minutes. The chart in FIG. 16 can be used for determining the required nickel iron (NiFe) film thickness in the ELG for other tunnel junction sensors with copper layers of various thicknesses.

DISCUSSION

It should be understood that the photolithography steps can be accomplished with a negative photoresist instead of a positive photoresist. In a negative photoresist the light exposure step exposes the bilayer photoresist to light where the photoresist is to be retained instead of removed. Also, the steps shown in FIGS. 14A–14F may be employed for constructing any CPP sensor in addition to the tunnel junction sensor. The spin valve sensor shown in FIG. 4 may have additional layers than to that shown, such as the pinned layer 74 may be multiple layers for an antiparallel (AP) pinned layer and the free layer 76 may be a bilayer of nickel iron (NiFe) and cobalt iron (CoFe) as desired. Similarly, the tunnel junction sensor 100 in FIG. 5 may be composed of additional layers.

Typically, the ELG has a track width which is greater than the track width of either of the spin valve or tunnel junction sensor. This has been found to be desirable for the lapping algorithm. The invention permits the ELG to be made of anticorrosive materials which eliminates corrosive materials composed of cobalt, cobalt iron and antiferromagnetics typically employed in spin valve and tunnel junction sensors and copper typically employed in spin valve sensors. It is preferable that the back edges of the ELG and the one or more sensors be aligned so that their stripe heights will be equal after lapping to the ABS. If the back edge of the ELG is pushed further back into the head the rate of change of the resistance will be decreased per stripe height, and if the track width of the ELG is widened the amount of change per stripe height will be increased. It is important that the magnetoresistance of the ELG be low and preferably lower than the read sensors so that stray magnetic fields will not change its resistance. With multiple films of nickel iron (NiFe) and tantalum (Ta) this can be achieved. A desired value of sheet resistance for the ELG is 5 to 10 ohms/sq. The magnetoresistive coefficient DR/R where dr is the change in resistance of the sensor and R is the resistance of the sensor when the magnetic moments of the pinned and free layers are aligned. The magnetoresistive coefficient DR/R of a spin valve sensor can be on the order of 6% while the magnetoresistive coefficient DR/R of a tunnel junction sensor can be as high as 15%. The magnetoresistive coefficient DR/R of the afore-mentioned nickel iron (NiFe) and tantalum (Ta) layers can be about 2%. Accordingly, stray magnetic fields will not affect the ELG nearly as much as it would affect the materials of the spin valve sensor or the tunnel junction sensor material.

The reason the width of the ELG should be greater than the width of the sensor is to provide more precision in a lapping algorithm. The typical resistance of a final lapped spin valve sensor is 50 ohms whereas a more desirable resistance for target lapping of the ELG is about 300 ohms. With this scenario it would be desirable for the ELG to have a width about 6 times that of the sensor. A preferred nickel iron ratio is $Ni_{80}Fe_{20}$.

In another embodiment of the invention the end point milling of the ELG may occur before the end point milling of the sensor with the ELG milling, for example, 20% faster than the sensor. This will allow more precision in milling the sensor. The afore-mentioned overmill into the first read gap layer may be on the order of 20Å.

It should be understood that the row of ELGs and spin valve sensors in FIG. 7 may have any arrangement desired, such as a number of spin valve sensors may be adjacent each other followed by an ELG and after the ELG another number of spin valve sensors may be located and so on. As an example, the spin valve sensors may be separated by 1065 Å and occasionally, as desired, an ELG may be located between a pair of spin valve sensors in a sufficient number to ensure proper lapping of the row of sensors.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making an electronic lapping guide (ELG) for a read sensor comprising the steps of:
    forming a sensor material layer on a wafer;
    removing a portion of the read sensor material layer at an ELG material site on the wafer and forming an ELG material layer at the ELG material site;
    the ELG material layer being composed of a different material than the read sensor material layer;
    forming first and second track widths for the read sensor and the ELG respectively; and
    forming first and second back edges at first and second stripe height sites on the wafer for the read sensor and the ELG respectively.

2. A method of making an electronic lapping guide (ELG) as claimed in claim 1 wherein the sensor material layer and the ELG material layer have equal milling rates.

3. A method of making an electronic lapping guide (ELG) as claimed in claim 2 wherein the ELG material layer includes multiple films with different milling rates.

4. A method of making an electronic lapping guide (ELG) as claimed in claim 3 wherein the ELG material layer includes a nickel iron (NiFe) film and a tantalum (Ta) film.

5. A method of making an electronic lapping guide (ELG) as claimed in claim 4 wherein a magnetoresistance (MR) of the ELG material layer is less than a magnetoresistance (MR) of the sensor material layer.

6. A method of making an electronic lapping guide (ELG) as claimed in claim 5 including the steps of:
    forming multiple read sensors and ELGs in rows and columns on the wafer;
    dicing the wafer into rows of read sensors and ELGs;
    connecting a computer with a lapping algorithm to at least one ELG in a row;
    lapping the row;
    monitoring the resistance of the ELG with the lapping algorithm of the computer and stopping the lapping when the resistance of the ELG corresponds to a desired air bearing surface (ABS).

7. A method of making an electronic lapping guide (ELG) as claimed in claim 1 wherein a magnetoresistance (MR) of the ELG material layer is less than a magnetoresistance (MR) of the sensor material layer.

8. A method of making an electronic lapping guide (ELG) as claimed in claim 1 wherein a single photolithography step is employed for the step of forming the first and second back edges.

9. A method of making an electronic lapping guide (ELG) as claimed in claim 1 wherein the first and second stripe heights are equal.

10. A method of making an electronic lapping guide (ELG) as claimed in claim 1 wherein the second track width is greater than the first track width.

11. A method of making an electronic lapping guide (ELG) as claimed in claim 1 wherein the sensor material layer is a spin valve sensor material layer and further including the steps of:
    forming first and second lead layers that are connected to the read sensor and which are spaced apart by said first track width;
    forming first and second lead layers that are connected to the ELG and which are spaced apart by said second track width; and
    employing a single photolithography step for the step of forming the first and second hard bias layers and the step of forming the first and second lead layers.

12. A method of making an electronic lapping guide (ELG) as claimed in claim 11 wherein a sheet resistance of the ELG material layer is lower than a sheet resistance of the sensor material layer.

13. A method of making an electronic lapping guide (ELG) as claimed in claim 12 wherein the sensor material layer and the ELG material layer have equal milling rates.

14. A method of making an electronic lapping guide (ELG) as claimed in claim 13 wherein the ELG material layer includes multiple films with different milling rates.

15. A method of making an electronic lapping guide (ELG) as claimed in claim 14 wherein the ELG material layer includes a nickel iron (NiFe) film and a tantalum (Ta) film.

16. A method of making an electronic lapping guide (ELG) as claimed in claim 15 wherein a magnetoresistance (MR) of the ELG material layer is less than a magnetoresistance (MR) of the sensor material layer.

17. A method of making an electronic lapping guide (ELG) as claimed in claim 16 wherein a single photolithography step is employed for the step of forming the first and second back edges.

18. A method of making an electronic lapping guide (ELG) as claimed in claim 17 wherein the first and second stripe heights are equal.

19. A method of making an electronic lapping guide (ELG) as claimed in claim 18 wherein the second track width is greater than the first track width.

20. A method of making an electronic lapping guide (ELG) as claimed in claim 19 including the steps of:

forming multiple read sensors and ELGs in rows and columns on the wafer;

dicing the wafer into rows of read sensors and ELGs;

connecting a computer with a lapping algorithm to at least one ELG in a row;

lapping the row;

monitoring the resistance of the ELG with the lapping algorithm of the computer and stopping the lapping when the resistance of the ELG corresponds to a desired air bearing surface (ABS).

21. A method of making an electronic lapping guide (ELG) as claimed in claim 1 wherein the sensor material layer is a tunnel valve sensor material layer and further including the steps of:

forming first and second hard bias layers that are connected to the read sensor and which are spaced apart by said first track width; and forming first and second lead layers that are connected to the ELG and which are spaced apart by said second track width;

employing a first photolithography step for the step of forming the track width of the read sensor and for the step of forming the first and second hard bias layers connected to the read sensor; and before or after the first photolithography step employing a second photolithography step for the step of forming the track width of the ELG and the step of forming the first and second lead layers connected to the ELG.

22. A method of making an electronic lapping guide (ELG) as claimed in claim 21 wherein a sheet resistance of the ELG material layer is higher than a sheet resistance of the sensor material layer.

23. A method of making an electronic lapping guide (ELG) as claimed in claim 22 wherein the sensor material layer and the ELG material layer have equal milling rates.

24. A method of making an electronic lapping guide (ELG) as claimed in claim 23 wherein the ELG material layer includes multiple films with different milling rates.

25. A method of making an electronic lapping guide (ELG) as claimed in claim 24 wherein the ELG material layer includes a nickel iron (NiFe) film and a tantalum (Ta) film.

26. A method of making an electronic lapping guide (ELG) as claimed in claim 25 wherein a magnetoresistance (MR) of the ELG material layer is less than a magnetoresistance (MR) of the sensor material layer.

27. A method of making an electronic lapping guide (ELG) as claimed in claim 26 wherein a single photolithography step is employed for the step of forming the first and second back edges.

28. A method of making an electronic lapping guide (ELG) as claimed in claim 27 wherein the first and second stripe heights are equal.

29. A method of making an electronic lapping guide (ELG) as claimed in claim 28 wherein the second track width is greater than the first track width.

30. A method of making an electronic lapping guide (ELG) as claimed in claim 29 including the steps of:

forming multiple read sensors and ELGs in rows and columns on the wafer;

dicing the wafer into rows of read sensors and ELGs;

connecting a computer with a lapping algorithm to at least one ELG in a row;

lapping the row;

monitoring the resistance of the ELG with the lapping algorithm of the computer and stopping the lapping when the resistance of the ELG corresponds to a desired air bearing surface (ABS).

31. An article of manufacture comprising:

a wafer;

at least one electronic lapping guide (ELG) on said wafer wherein the ELG has a first sheet resistance;

at least one read head on said wafer wherein the read head has a read sensor;

the read sensor having a second sheet resistance; and the first and second sheet resistances being different.

32. An article as claimed in claim 31 wherein the ELG has a magnetoresistance that is lower than a magnetoresistance of the read sensor.

33. An article as claimed in claim 32 including:

the read sensor being a spin valve sensor;

first and second lead layers connected to the ELG and spaced apart by a first track width;

second and third lead layers connected to the read sensor and spaced apart by a second track width.

34. An article as claimed in claim 33 wherein the sheet resistance of the ELG is lower than the sheet resistance of the spin valve sensor.

35. An article as claimed in claim 34 including:

the spin valve sensor having at least an antiferromagnetic layer, a cobalt based layer and a copper layer; and the ELG having no layer that is antiferromagnetic, cobalt based or copper.

36. An article as claimed in claim 35 wherein the first track is greater than the second track width.

37. An article as claimed in claim 36 including:

the ELG having a first stripe height and the spin valve sensor having a second stripe height; and the first and second stripe heights being equal.

38. An article as claimed in claim 32 including:

the read sensor being a tunnel junction sensor;

first and second lead layers connected to the ELG and spaced apart by said first track width; and first and second hard bias layers connected to the tunnel junction sensor and spaced apart by said second track width.

39. An article as claimed in claim 38 wherein the sheet resistance of the ELG is higher than the sheet resistance of the tunnel junction sensor.

40. An article as claimed in claim 39 including:

the tunnel junction sensor including at least an antiferromagnetic layer and a cobalt based layer; and the ELG having no layer that is antiferromagnetic, cobalt based or copper.

41. An article as claimed in claim 40 wherein the first track width is greater than the second track width.

42. An article as claimed in claim 41 including:

the ELG having a first stripe height and the tunnel junction sensor having a second stripe height; and the first and second stripe heights being equal.

* * * * *